United States Patent
Kouros et al.

(10) Patent No.: US 8,939,399 B2
(45) Date of Patent: Jan. 27, 2015

(54) SYSTEM AND METHOD OF AUGMENTING POWER IN A ROTORCRAFT

(75) Inventors: Areian Kouros, Keller, TX (US); Roger Aubert, Arlington, TX (US); Paul Madej, Grand Prairie, TX (US)

(73) Assignee: Textron Innovations Inc., Providence, RI (US)

( * ) Notice: Subject to any disclaimer, the term of this patent is extended or adjusted under 35 U.S.C. 154(b) by 98 days.

(21) Appl. No.: 13/563,086

(22) Filed: Jul. 31, 2012

(65) Prior Publication Data

US 2014/0034781 A1    Feb. 6, 2014

(51) Int. Cl.
| | |
|---|---|
| *B64C 27/00* | (2006.01) |
| *B64C 27/12* | (2006.01) |
| *B64D 25/00* | (2006.01) |
| *B64D 41/00* | (2006.01) |

(52) U.S. Cl.
USPC ............................. 244/58; 244/60; 244/17.11

(58) Field of Classification Search
CPC ...... B64D 41/00; B64D 41/007; B64D 35/00; B64D 35/08; B64D 33/00; B64D 2027/026; B64C 27/006
USPC ............ 244/60, 58, 53 A, 53 R, 17.15, 17.13, 244/17.11
See application file for complete search history.

(56) References Cited

U.S. PATENT DOCUMENTS

| | | | |
|---|---|---|---|
| 3,455,182 A * | 7/1969 | Kelley .............................. | 244/58 |
| 6,993,915 B2 * | 2/2006 | Kung et al. ..................... | 60/772 |
| 8,424,800 B2 * | 4/2013 | Finney ............................. | 244/58 |
| 8,464,980 B2 * | 6/2013 | Certain ............................ | 244/58 |
| 2002/0145076 A1 * | 10/2002 | Alford ............................. | 244/60 |
| 2009/0121546 A1 * | 5/2009 | Langlois et al. ............... | 307/23 |
| 2010/0013223 A1 | 1/2010 | Certain | |
| 2011/0190963 A1 | 8/2011 | Glassl et al. | |
| 2011/0281679 A1 | 11/2011 | Larrabee et al. | |
| 2012/0025032 A1 | 2/2012 | Hopdjanian | |

FOREIGN PATENT DOCUMENTS

| | | |
|---|---|---|
| DE | 102010021026 A1 | 11/2011 |
| FR | 2962404 | 1/2013 |
| FR | 2902024 A1 | 12/2013 |

OTHER PUBLICATIONS

Extended European Search Report from the European Patent Office in related European Patent Application No. 12182851, issued Oct. 15, 2012, 7 pages.
European Office Action in related European patent application No. 12182851.1, 4 pages, mailed Oct. 9, 2013.
Third Party Observation Submission in related European patent application No. 12182851.1, 22 pages, mailed Feb. 24, 2014.
Third Party Observation Submission in related European patent application No. 12182851.1, 72 pages, mailed Feb. 24, 2014.

(Continued)

*Primary Examiner* — Timothy D Collins
*Assistant Examiner* — Richard R Green
(74) *Attorney, Agent, or Firm* — James E. Walton; Richard G. Eldredge

(57) ABSTRACT

The present application relates to a regenerative or hybrid drive system for an aircraft. The drive system includes the use of a power augmentation device to selectively engage the drive system of an aircraft to store power. The power in the power augmentation device being configured to release a power burst to systems within the aircraft to perform critical flight maneuvers.

16 Claims, 6 Drawing Sheets

(56) References Cited

OTHER PUBLICATIONS

Summons to attend oral proceedings dated May 22, 2014 from counterpart EP App. No. 12182851.1.

Office Action dated Sep. 19, 2014 from counterpart CA App. No. 2,821,104.

European Search Report dated Oct. 7, 2014 from counterpart EP App. No. 12182851.1.

* cited by examiner

SYSTEM AND METHOD OF AUGMENTING POWER IN A ROTORCRAFT

BACKGROUND

1. Technical Field

The present application relates in general to power generation in aircraft. More specifically, the present application relates to selective power augmentation within the drive system.

2. Description of Related Art

Aircraft engines within a drive system generate sufficient power to permit flight. Some maneuvers, such as takeoffs, auto-rotation, and landing, can require a greater amount of power from the engines than typically required in regular flight. Aircraft engines are sized to be able to generate this needed power at selected times and typically in short bursts. Because these maneuvers usually consist of a relatively small portion of the operational time of the aircraft, engines are regularly oversized.

For example, rotorcraft engines generally operate at a medium speed so as to deliver a medium power, e.g. the so-called maximum continuous power for a helicopter. However, aircraft engines are sometimes called upon to deliver higher power for a short period, such as maximum takeoff power for a helicopter. The need to deliver increased power output at selected times results in aircraft engines typically being oversized relative to medium power operation. This results in less efficiency, more fuel consumption, and greater weight on the aircraft.

Various systems have been developed to generate or store additional power for engines. Automotive vehicles use regenerative braking and/or dynamic braking, for example. Such systems use large sized battery banks to store electrical energy. These systems are typically heavy which could greatly limit the flight capacities of a rotorcraft. Furthermore, such systems are often continuously engaged to permit charging of the batteries when the engine is providing power. A drive system needs to be developed that permits greater efficiency while still providing additional power to the aircraft as required to perform a full range of maneuvers.

Although great strides have been made in the power generation of rotorcraft, considerable shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
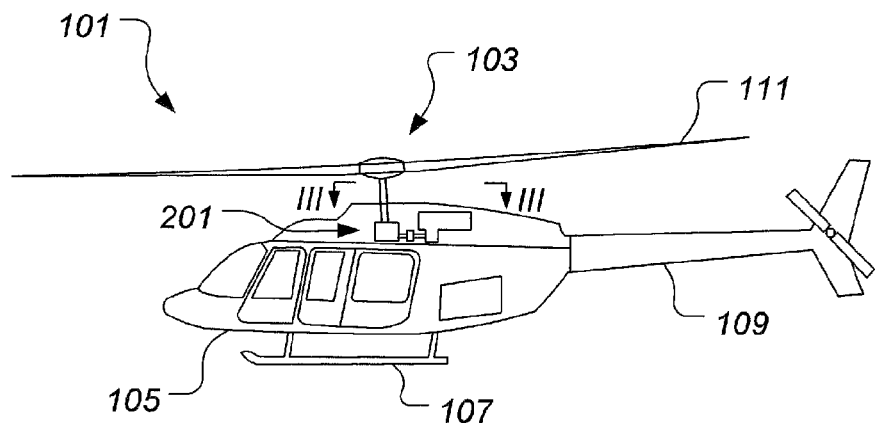
FIG. 1 is a side view of a rotorcraft, according to an embodiment of the present application.

Referring to FIG. 1 in the drawings, a rotorcraft 101 having a regenerative drive system 201 is illustrated. Rotorcraft 101 has a rotor system 103 with a plurality of rotor blades 111. The pitch of each rotor blade 111 can be selectively controlled in order to selectively control direction, thrust, and lift of rotorcraft 101. Rotorcraft 101 further includes a fuselage 105, landing gear 107, and a tail member 109.

Figure 2:
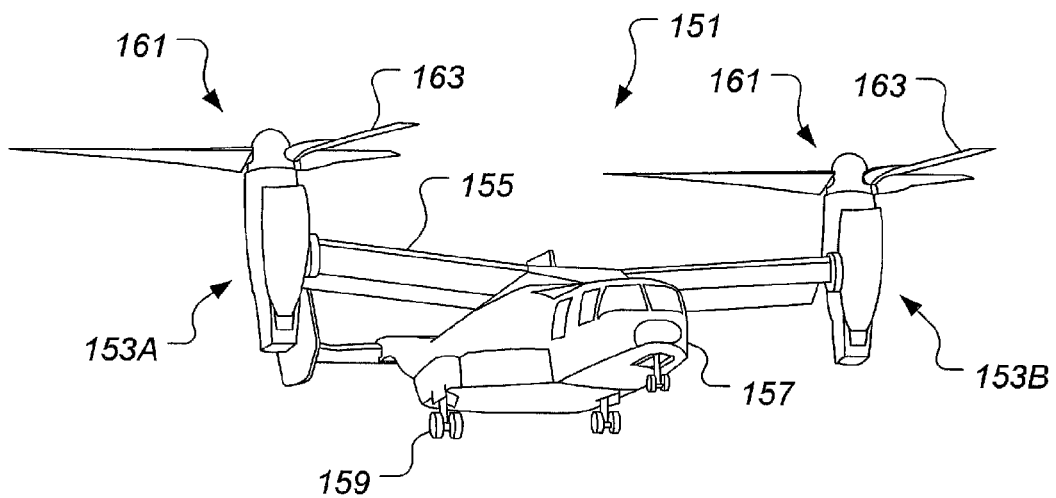
FIG. 2 is a perspective view of a tilt rotor aircraft, according to an embodiment of the present application.

Referring now also to FIG. 2 in the drawings, a tiltrotor aircraft 151 is illustrated. Tiltrotor aircraft 151 includes a fuselage 157, a landing gear 159, a wing 155, and rotatable nacelles 153a and 153b. Each nacelle 153a and 153b includes a plurality of rotor systems 161, each having a plurality of rotor blades 163. The position of nacelles 153a and 153b, as well as the pitch of rotor blades 163, can be selectively controlled in order to selectively control direction, thrust, and lift of tiltrotor aircraft 151. Tiltrotor aircraft 151 also includes regenerative drive system 201 to selectively augment power provided to tiltrotor aircraft 151. It is understood that regenerative drive system 201 may or may not be designed to be rotatable with rotor system 161. Furthermore regenerative drive system 201 may be used with aircraft having one or more sets of rotor systems 103, 161.

It is understood that rotorcraft 101 and tiltrotor aircraft 151 are both aircraft. The term aircraft is not so narrow as to be limited by these types of aircraft. For purposes of this application, aircraft may include any machine supported for flight in the air, by buoyancy, or by the dynamic action of air on its surfaces. Examples of possible aircraft include powered airplanes, gliders, tiltrotors, and rotorcraft such as helicopters and compound helicopters. Therefore the term "aircraft" will relate to rotorcraft 101, tiltrotor aircraft 151, and all other forms of aircraft.

Figure 3:
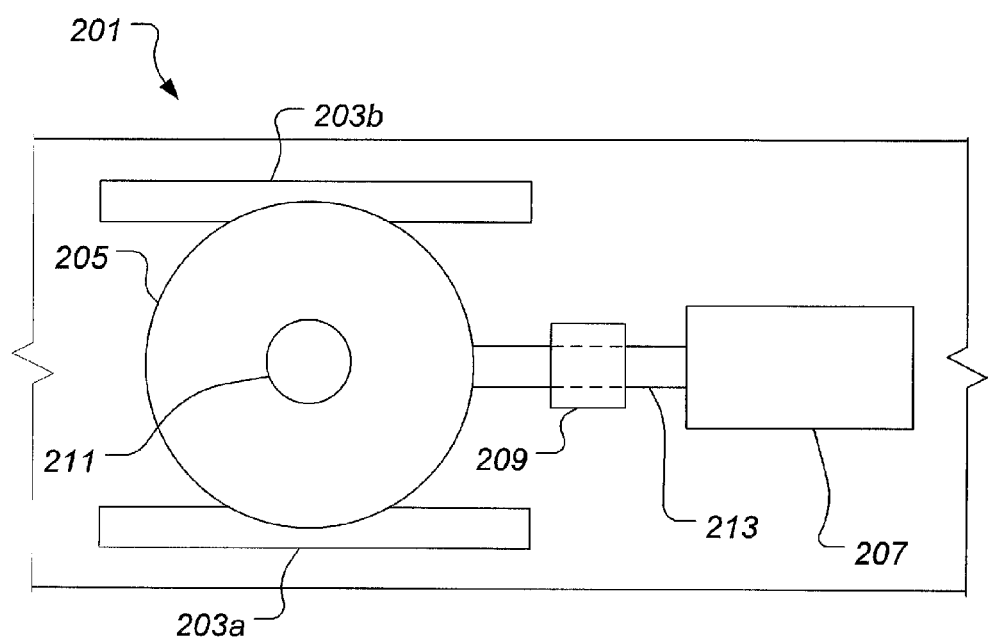
FIG. 3 is a schematic view of a hybrid drive system of FIG. 1, according to an embodiment of the present application.

Referring now also to FIG. 3 in the drawings, a hybrid or regenerative drive system 201 is illustrated according to the preferred embodiment of the present application within a single engine aircraft. Drive system 201 includes the use of an engine 207, a transmission 205, a driveshaft 213, and a power augmentation device 209 to selectively provide supplemental power to the aircraft with or without an overrunning clutch. System 201 may be used with or without an overrunning clutch in all the embodiments described and taught within this application.

Figure 4:
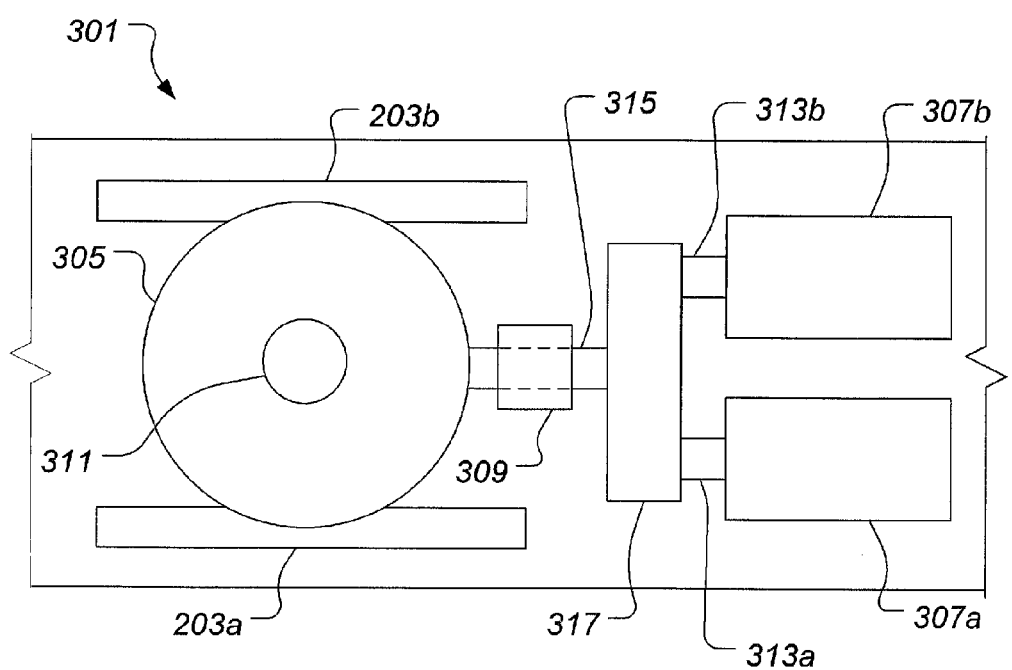
FIG. 4 is a schematic view of an alternative embodiment of the hybrid drive system of FIG. 3.
Figure 5:
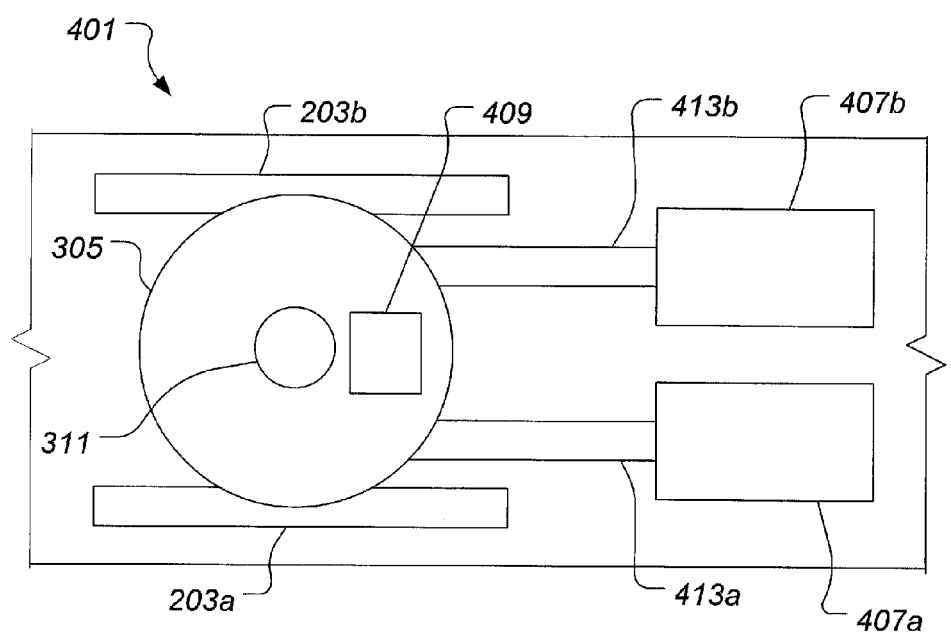
FIG. 5 is a schematic view of an alternate embodiment of the hybrid drive system of FIG. 3.
Figure 6:
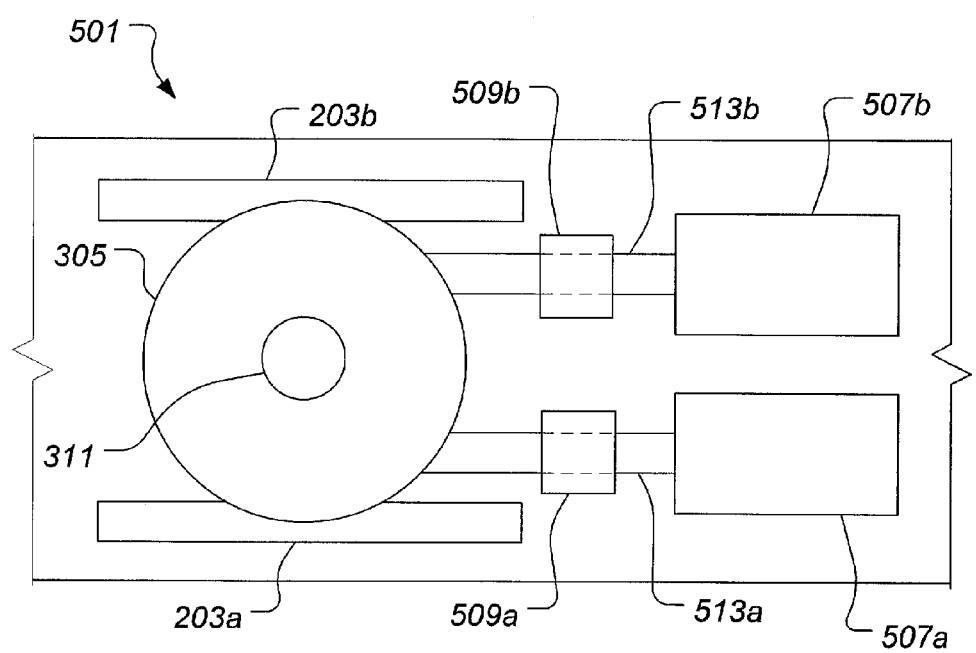
FIG. 6 is a schematic view of an alternate embodiment of the hybrid drive system of FIG. 3.

Drive system 201 may be used with single engine aircraft or multiple engine aircraft. FIGS. 4-6 illustrate the use of drive system 201 with a multiple engine aircraft. Engine 207 is coupled to transmission 205 by a single driveshaft 213. Engine 207 is configured to rotate driveshaft 213, which in turn rotates within transmission 205. This rotational energy is harnessed by transmission 205 and used to rotate rotor system 103, 161.

Engine 207 is configured to generate power that is transmitted to the transmission and other systems on the aircraft. Engine power can be used in different forms. Engine 207 assists in the production of mechanical and electrical power used to run the various systems on the aircraft, for example: pumps and blowers. Furthermore, engine 207 produces mechanical power transmitted through a rotating driveshaft 213 to transmission 205. Driveshaft 213 extends between, and is coupled to, both transmission 205 and engine 207. Transmission 205 receives and directs the engine power provided through driveshaft 213 to provide rotational energy to rotor system 103, 161 through one or more main rotor shafts 211. Transmission 205 is coupled to the aircraft via an airframe 203a, 203b.

Emergency conditions may arise with a single engine aircraft where the engine begins to fail or suddenly fails. Under such conditions, an aircraft may become unresponsive. Without a source of power, the aircraft may lose total control. Failure of an engine occurs when the engine begins to provide less power to the aircraft than is required to perform conventional flight maneuvers as described in more detail below. Drive system 201 is configured to selectively store power and provide selectively controlled power bursts, or a release of power, during emergency conditions and/or special operating conditions through the use of device 209 as opposed to power output solely from engine 207. This power is obtained by taking power produced by engine 207 and storing the power for future use. These power bursts provide the necessary additional power required to perform critical flight maneuvers, such as a safe landing or a balked landing followed by a climb-out with the remaining engine. The power burst provided by device 209 either supplements engine 207 and/or provides power in place of engine 207 to perform critical flight maneuvers.

Power augmentation device 209 is a device that selectively stores energy on-demand and then selectively provides the stored energy to any number of sources. Power augmentation device 209 provides the power bursts by releasing stored power back into drive system 201 for use in rotor system 103, 161 or other flight control systems on the aircraft. For example, device 209 can be a kinetic energy recovery system used to supply mechanical or electrical power to the aircraft.

Device 209 is coupled to driveshaft 213 operatively coupled between transmission 205 and engine 207. Device 209 selectively engages a portion of driveshaft 213 without interfering with the direct coupling of engine 207 and transmission 205. This feature permits device 209 to be installed and/or removed from existing drive systems, as a retrofit application, for example. Although described as being coupled to driveshaft 213, it is understood that device 209 may be coupled to any location in mechanical communication with engine 207. For example, device 209 may be located within transmission 205, as seen in FIG. 5.

Device 209 may operate in a number of ways. First device 209 is configured to spin-up, meaning to selectively charge or store up power. Secondly, device 209 is configured to timely release a power burst, meaning producing a controlled power output. Each operation is done under controlled conditions.

With respect to the spin-up of device 209, spin-up occurs during times of an emergency, such as when one engine is failing, unresponsive, or shut down. Likewise, spin-up can also occur during special operating conditions, such as flight specific and mission specific maneuvers. An example of a special operating condition is a Category A takeoff. Under such a maneuver, a critical decision point (height above the ground) is defined for which a continued takeoff can be accomplished following the complete failure of one engine. The critical decision point is based upon a total energy concept involving kinetic energy (airspeed) and potential energy (height). With a special operating condition, it is preferred that device 209 has been charged prior to performing the maneuver. Therefore, device 209 is configured to spin-up during and/or before the emergency and special operating conditions. This can have an effect on the determination of the critical decision point for the aircraft.

Device 209 selectively alternates between a plurality of orientations to timely and selectively store power. In a first orientation, device 209 is disengaged from driveshaft 213. This means that the charging elements of device 209 are separated from members of drive system 201 so as to reduce drag and prevent spin-up. In a second orientation, device 209 engages members of drive system 201 while engine 207 is operating in order to generate stored power. During the second orientation, device 209 produces a drag, or resistance to motion, on driveshaft 213. This stored power may be in the form of electrical energy, in a battery for example, or in the form of mechanical energy in the use of springs or flywheels, for example.

Under normal operation, when engine 207 is fully operational, device 209 is disengaged from driveshaft 213. When engine 207 begins to fail or in case of an emergency, device 209 engages driveshaft 213 and begins to store power in case the time comes to release the power back into system 201 and/or the aircraft in the form of a power burst in order to perform a critical flight maneuver. Under special operating conditions, device 209 may engage driveshaft 213 and immediately provide the power burst if device 209 was spun-up prior to performing the maneuver. After spin-up is complete and prior to delivering the power burst, device 209 may selectively disengage from driveshaft 213. An advantage to having device 209 selectively engage and disengage from driveshaft 213 is that drag on driveshaft 213 is reduced when device 209 is not being used. When disengaged, power is not able to be collected in device 209 and the driveshaft is permitted to freely spin without additional drag from device 209.

In other embodiments, device 209 may be configured to continuously engage driveshaft 213. In this embodiment, device 209 is configured, so as to maintain a continuously stored amount of power for use in emergency and/or special operating conditions like the Category A maneuver. In these embodiments, the drag on driveshaft 213 is continuous and leads to a less efficient operation of system 201 during normal operating conditions. Within any of the preceding embodiments, device 209 can be configured with a clutch mechanism having frictionless bearings. However, it is understood that device 209 may be configured to refrain from collecting and/or storing energy until an emergency situation arises.

With respect to the operation of device 209 concerning the release of power or the performance of a power burst, system 201 is configured to release selected amounts of stored power from device 209 back into system 201 and/or the aircraft. First, device 209 may release selected amounts of power automatically in order to maintain critical flight systems and/or perform critical flight maneuvers. The amount of power released back into drive system 201 and the aircraft may be regulated by flight control systems in order to conserve power and to provide for the accurate and timely distribution of power within the systems of the aircraft. The flight control system may selectively control the magnitude and duration of stored power being stored and released, the system receiving the power burst, as well as the timing of the power burst. Secondly, device 209 may store and release power based upon commands from a pilot and/or crewmember of the aircraft. The pilot and/or crewmember may selectively control the magnitude and duration of stored power released, the system receiving the power burst, and the timing of the power burst.

The power burst may be in the form of additional mechanical power and/or electrical power provided to flight systems within the aircraft. The duration and magnitude of the power burst may be regulated. Furthermore, the power burst may be intermittent in that device 209 may engage and disengage to provide multiple power bursts. Additionally, it is understood that device 209 may spin-up multiple times during an emergency condition and/or special operating condition. Likewise, device 209 may recharge or spin-up multiple times before discharging all the stored power.

In the preferred embodiment, device 209 is configured as a self contained unit in which device 209 contains all the necessary parts to collect and store the power from members of drive system 201, and to discharge stored power to drive system 201. It is understood that device 209 may contain multiple units permitting the repair and replacement of specific units within device 209.

In the preferred embodiment, system 201 will activate or deactivate device 209 automatically as controlled by automated flight control systems on the aircraft. In such a configuration, device 209 uses any number of sensors from existing flight control systems to measure the performance of engine 207. When performance has deteriorated to a predetermined point, or when the condition of engine 207 is deteriorating at a predetermined rate, engine 207 is considered to have failed and system 201 automatically engages and disengages device 209 to collect, store, and discharge stored power.

Device 209 is configured to spin-up to full power within a selected time limit. For example, device 209 can be configured to take 8 seconds to store full power. This time limit may vary depending on many factors. Design constraints and aircraft capabilities, among others, are to be considered in the sizing of device 209. For example, device 209 may be capable of producing 20 horsepower for a duration of 30 seconds. However, a larger power augmentation device 209 may have a production capability larger than 20 horsepower for a duration other than 30 seconds.

Referring now also to FIG. 4 in the drawings, a drive system 301 having a plurality of engines is illustrated. Drive system 301 is a dual engine drive system for one or more main rotor shafts 311. The elements of drive system 301 are similar in form and function to that of those described in drive system 201 except as noted herein. Drive system 301 differs with respect to several areas as will be described in further detail. Drive system 301 includes a first engine 307a and a second engine 307b, a single torque-combining gearbox (cobox) 317, a power augmentation device 309, and a transmission 305. Three separate shafts are used within drive system 301, namely a first gearbox input shaft 313a, a second gearbox input shaft 313b, and a main driveshaft 315.

A key performance parameter for multiple engine aircraft drive systems is the ability to operate under a One Engine Inoperative (OEI) condition. Under such conditions, an aircraft engine becomes unresponsive, fails or is shut down, resulting in the aircraft using only a single engine. The second, or additional, engines are designed to have a given OEI rating. The OEI rating refers to a measure of time that the remaining engine can produce a desired amount of additional power (power burst) if one engine becomes unresponsive, fails or is shut down during a critical flight maneuver, such as takeoff, rejected takeoff, or landing, for example. This additional power burst is required to meet the minimum power requirement and is intended for execution of the critical flight maneuver. For example, an OEI rating may be for thirty seconds of additional supplemental power. Device 309 and similarly device 209 are configured to provide power bursts as needed, so as to allow engines 307a, 307b, 207 to be optimized and sized for efficiency.

Drive system 301 has multiple engines 307a, 307b and a single device 309 to provide power bursts. In this configuration, each engine 307a, 307b is operably coupled to cobox 317 through input shafts 313a, 313b respectively. Cobox 317 is configured to receive the input shafts of engines 307a, 307b and combine the power into the single main driveshaft 315 that feeds power to transmission 305.

Device 309 is coupled to main driveshaft 315 between cobox 317 and transmission 305. As one of engines 307a, 307b fails, a single device 309 is able to provide power rather than requiring additional power augmentation devices.

Referring now also to FIG. 5 in the drawings, a drive system 401 is illustrated as another embodiment of drive system 201. Drive system 401 illustrates another configuration wherein a single power augmentation device is used with multiple engines. Drive system 401 includes a first engine 407a, a second engine 407b, a first driveshaft 413a, a second driveshaft 413b, a power augmentation device 409, and transmission B305. Drive system 401 is a dual engine drive system for a single rotor system 103. The elements of drive system 401 are similar in form and function to that of those described in drive system 201 except as noted herein. Drive system 401 differs with respect to a couple areas as will be described in further detail.

With respect to drive system 401, each engine 407a, 407b is directly coupled to transmission 305 through driveshafts 313a, 313b, respectively. Device 409 is located within transmission 305. In this embodiment, device 409 may be operably coupled and configured to engage and disengage transmission 305 directly. This configuration successfully removes the need to have cobox 317. Transmission 305 is configured to receive and combine the power generated from each engine 407a, 407b for use in main rotor shaft 311. Device 409 is coupled within transmission 305 between main rotor shaft 311 and the point of combining driveshafts 413a, 413b within transmission 305.

Referring now also to FIG. 6 in the drawings, a drive system 501 is illustrated as another embodiment of drive system 201. Drive system 501 illustrates a configuration wherein multiple power augmentation devices are used with multiple engines. The elements of drive system 501 are similar in form and function to that of those described in drive system 201 except as noted herein. In particular, drive system 501 is structurally similar to that of drive system 401, wherein each engine has a driveshaft directly coupled to transmission 305. However, drive system 501 differs in having a power augmentation device 509a, 509b for each engine 507a, 507b respectively. Drive system 501 includes a first engine 507a, a second engine 507b, a first driveshaft 513a, a second driveshaft 513b, first power augmentation device 509a, second power augmentation device 509a, and transmission 305.

Devices 509a, 509b are coupled to driveshafts 513a, 513b as opposed to being located within transmission 305 as seen in drive system 401. Devices 509a, 509b operate similarly in form and function as described with device 209. Drive system 501 is configured to spin-up one or both devices 509a, 509b similarly to that described with device 209. Additionally, drive system 501 is configured to determine which device 509a, 509b is selected to spin-up, the device coupled to the good remaining engine or that of the failed or failing engine. Devices 509a, 509b may be in electrical or mechanical communication so as to share power between themselves. In such an embodiment, a fully operable remaining engine may be used to spin-up both devices 509a, 509b.

Although the preceding embodiments describe no more than a single power augmentation device for use with a single engine, it is understood that multiple power augmentation devices may be used with a single engine. For example drive system 501 may use a plurality of power augmentation devices coupled in any mechanical formation. For example, the devices are coupled mechanically in a series formation along a single drive shaft.

Figure 7:
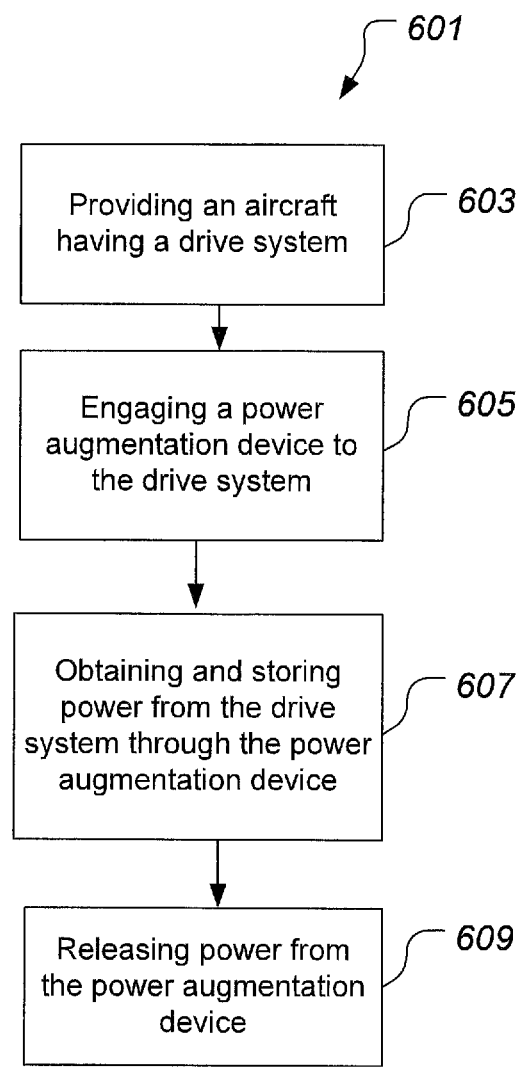
FIG. 7 is a chart of the method of providing supplemental power to an aircraft according to the preferred embodiment of the present application.

Referring now also to FIG. 7 in the drawings, a chart 601 of the method of providing power according to the embodiments of FIGS. 3-6 is illustrated. The method includes use of an aircraft that has a drive system, including an engine, transmission, and a driveshaft 603. The aircraft has a power augmentation device that is installed within the drive system either upon the original manufacture of the aircraft or upon a retrofit operation after final build. Flight control systems within the aircraft are configured to monitor the power output of the engines. When a single engine is determined to have failed, become unresponsive, or is shut down prior to an emergency or special operating condition, the system or the pilot may relay a command to engage the power augmentation device to the drive system 605. This engagement allows for the device to spin-up and store power for use during critical flight maneuvers 607. The power within the device may be released back into the drive system or control systems of the aircraft as desired by the pilot or proscribed by the flight control systems 609. The device may be re-engaged as needed to acquire and provide the necessary power burst, so as to provide a plurality of separate and distinct power bursts.

The systems and methods of the present application provides significant advantages, including: (1) more optimally sized engines for use of aircraft; (2) decreased emissions and increased fuel efficiency; (3) selective power storage sufficient to enable an aircraft to perform critical flight maneuvers; and (4) a hybrid drive system for an aircraft that supplements engine power during emergency conditions.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A regenerative drive system for an aircraft, comprising:
a drive system configured to generate power for the aircraft having:
a first engine for generating power;
a transmission coupled to the first engine, the transmission configured to receive power from the engine and drive a rotor system;
a first driveshaft coupled between the first engine and the transmission for transferring power;
a first power augmentation device configured to selectively store energy produced by the first engine and provide supplemental power to the aircraft during flight, the first power augmentation device in selective communication with the driveshaft;
wherein the first power augmentation device is configured to selectively engage and disengage the drive shaft during flight, the first power augmentation device configured to disengage from the driveshaft during flight so as to reduce drag on the first engine and prevent spin-up of the first power augmentation device, the first power augmentation device remaining disengaged after spin-up and prior to delivering a power burst.

2. The regenerative drive system of claim 1, wherein the first power augmentation device selectively stores power automatically as a result of automated flight control systems, the flight control system initiating engagement of the power augmentation device with the first driveshaft.

3. The regenerative drive system of claim 1, wherein the first power augmentation device selectively stores power as a result of a pilot input.

4. The regenerative drive system of claim 1, further comprising:
a second engine for generating power for the aircraft, the second engine providing power to the transmission through a second driveshaft.

5. The regenerative drive system of claim 4, wherein the first power augmentation device is located within the transmission.

6. The regenerative drive system of claim 4, wherein power from the first engine and the second engine is transferred to the first power augmentation device through a cobox and a main driveshaft.

7. The regenerative drive system of claim 4, wherein the first power augmentation device is configured to store power from multiple engines and distribute power to multiple systems on the aircraft.

8. The regenerative drive system of claim 4, further comprising a second power augmentation device operably coupled to the second engine to selectively store power, the first power augmentation device being operably coupled to the first engine.

9. The regenerative drive system of claim 8, wherein at least one of the first power augmentation device and the second power augmentation device begins to store power when the first engine experiences at least one of failure, unresponsiveness, and shut down.

10. The regenerative drive system of claim 8, wherein at least one of the first power augmentation device and the second power augmentation device begins to store power prior to an emergency condition.

11. The regenerative drive system of claim 8, wherein the drive system is configured to selectively provide supplemental power to the aircraft.

12. The regenerative drive system of claim 8, wherein the drive system is configured to provide selectively controlled power bursts during emergency conditions through the use of the first power augmentation device.

13. The regenerative drive system of claim 1, further comprising:

an aircraft;

wherein the supplemental power provided by the first power augmentation device is delivered to the aircraft in a power burst to operate aircraft systems for a durational time period.

14. A method of providing power to an aircraft, comprising:

providing an aircraft having a drive system including an engine, a driveshaft, and a transmission;

engaging a power augmentation device to the drive system of an aircraft during flight;

obtaining and storing a selected amount of power within the power augmentation device through the drive system of the aircraft;

releasing power from the power augmentation device to supplement systems within the aircraft; and selectively disengaging and re-engaging the drive system to provide a plurality of separate distinct power bursts, the power augmentation device configured to disengage from the driveshaft during flight so as to reduce drag on the engine and prevent spin-up of the power augmentation device, the power augmentation device remaining disengaged after spin-up and prior to delivering a power burst.

15. The method of claim 14, wherein the power augmentation device engages the drive system upon one of the following: a pilot input and automatically in response to flight control systems.

16. The method of claim 14, further comprising:

measuring the performance of the engine with a flight control system configured to determine when the engine has failed.

* * * * *